(12) United States Patent
Artman et al.

(10) Patent No.: US 7,890,889 B2
(45) Date of Patent: Feb. 15, 2011

(54) USER-INTERFACE APPLICATION FOR MEDIA FILE MANAGEMENT

(75) Inventors: Tuomas Artman, Helsinki (FI); Sami Koskela, Helsinki (FI)

(73) Assignee: Nokia Corporation, Espoo (FI)

( * ) Notice: Subject to any disclaimer, the term of this patent is extended or adjusted under 35 U.S.C. 154(b) by 725 days.

(21) Appl. No.: 10/951,089

(22) Filed: Sep. 27, 2004

(65) Prior Publication Data

US 2006/0069998 A1    Mar. 30, 2006

(51) Int. Cl.
G06F 3/048    (2006.01)

(52) U.S. Cl. ................... 715/821; 715/721; 715/835; 715/864; 707/722

(58) Field of Classification Search ................ 715/721, 715/864, 821–823, 838, 830, 834, 835, 855, 715/716; 707/3, 102, E17.028, E17.029, 707/722, 805

See application file for complete search history.

(56) References Cited

U.S. PATENT DOCUMENTS

| | | | |
|---|---|---|---|
| 6,262,722 B1 | 7/2001 | Allison et al. | |
| 6,298,343 B1 | 10/2001 | Chang et al. | |
| 6,385,602 B1 | 5/2002 | Tso et al. | |
| 6,714,215 B1 | 3/2004 | Flora et al. | |
| 6,741,996 B1 * | 5/2004 | Brechner et al. | 707/102 |
| 6,775,666 B1 | 8/2004 | Stumpf et al. | |
| 6,925,608 B1 * | 8/2005 | Neale et al. | 715/763 |
| 7,437,681 B2 | 10/2008 | Misawa et al. | |
| 2002/0080197 A1 | 6/2002 | Masthoff | |
| 2002/0180803 A1 * | 12/2002 | Kaplan et al. | 345/810 |
| 2003/0001898 A1 | 1/2003 | Bernhardson | |
| 2003/0001907 A1 | 1/2003 | Bergsten et al. | |
| 2003/0090504 A1 | 5/2003 | Brook et al. | |
| 2003/0090524 A1 | 5/2003 | Segerberg et al. | |
| 2003/0095149 A1 | 5/2003 | Fredriksson et al. | |
| 2003/0172138 A1 | 9/2003 | McCormack et al. | |
| 2004/0135815 A1 * | 7/2004 | Browne et al. | 345/810 |

(Continued)

FOREIGN PATENT DOCUMENTS

DE    10237343 A1    4/2004

(Continued)

OTHER PUBLICATIONS

Russian Office Action, Russian Application No. 2007113616, Sep. 14, 2009.

(Continued)

*Primary Examiner*—William L Bashore
*Assistant Examiner*—Andrew Tank
(74) *Attorney, Agent, or Firm*—Alston & Bird LLP

(57) ABSTRACT

A media management user-interface (UI) application that provides access to media items and media files and provides browsing and search capabilities for locating media items within media files. The UI application may rely on a hierarchical display of various levels or categories of media files and, as such, the application is uniquely suited for portable digital devices having small displays. The hierarchal display of media file levels allows the user to easily browse through levels to identify a desired media file and to locate and display a desired media item. In addition, the UI application may provide for an easily activated search function that provides for keyword searches to be performed based on information that has been associated with media files and media items.

55 Claims, 9 Drawing Sheets

U.S. PATENT DOCUMENTS

2005/0235209 A1* 10/2005 Morita et al. ............... 715/716

FOREIGN PATENT DOCUMENTS

| EP | 1 104 151 A2 | 5/2001 |
| EP | 1185922 B1 | 6/2004 |
| JP | 2001 216065 (A) | 8/2001 |
| JP | 2003 242004 (A) | 8/2003 |
| JP | 2004 199696 (A) | 7/2004 |
| WO | WO 01/16690 A2 | 3/2001 |
| WO | WO 03/052638 | 6/2003 |

OTHER PUBLICATIONS

Examination Report issued by the Austrian Patent Office to the Intellectual Property Office of Singapore on Apr. 21, 2009, regarding Singapore Patent Application No. 200701934-2.

Notification of Reason(s) for Refusal issued by the Japanese Patent Office on Mar. 15, 2010, regarding Japanese Patent Application No. 2007-532993.

* cited by examiner

USER-INTERFACE APPLICATION FOR MEDIA FILE MANAGEMENT

FIELD OF THE INVENTION

The present invention relates to management of media items and, more specifically, to a user interface application for media management, typically implemented on digital communication devices, that provides search capabilities, visual presentation and access to media items.

BACKGROUND OF THE INVENTION

The rapid growth of digital communication has made it possible for all kinds of digital media files to be communicated amongst various types of wireless and wire line communication devices. For instance, the cellular or mobile telephone is no longer limited to telephonic voice communication and may include other means of digital communication, such as digital networking (i.e., Internet communication, text messaging, and the like). In addition, an increasing number of cellular telephones and other mobile wireless communication devices, such as portable computers, personal data assistants (PDAs) and the like, are being integrated with other means of capturing or producing digital media, such as digital cameras, digital audio recorders, digital video recorders and the like. Technological advances have made it possible for other digital devices, such as digital cameras, digital video recorders, digital audio devices and the like to be equipped with means for digital communication. As more and more digital devices possess the capability to digitally communicate with one another, the amount of digital media files that will be communicated amongst these devices will increase at an alarming rate.

In addition to the onset of more and more digital devices possessing digital communication capabilities, the digital storage capacity of these devices is constantly increasing. In the near future the majority of mobile digital communication terminals may well be equipped with storage capacity in the gigabyte range or greater, allowing these devices to store an enormous amount of digital data. In this environment it will no longer be prohibitive from a memory capacity standpoint to store a voluminous amount of large file types, such as video, audio or other multimedia files.

Portable digital devices, especially handheld digital devices, such as cellular telephones, PDAs or the like, are generally limited in terms of display size. For example, a cellular telephone display is typically less than 200×200 pixels, with current display size typically in the range of about 120×160 pixel. The smaller size display provides obstacles to users who desire the ability to quickly locate and access media files stored on the digital device. In particular, the small display size makes it difficult to identify media file content unless the entire file is displayed or a significant portion of the media file content is displayed. As such, it is often difficult to browse file content in order to locate a specific media item. Most conventional user interface applications for accessing files are designed for full-sized displays and, as such, are not conducive to implementation on handheld portable devices having small displays.

The problems related to locating and accessing media items on portable digital devices will be exasperated in the future when such portable devices provide for storage capacity in the gigabyte range. A user of such a device will be frustrated with trying to find a specific media item from amongst a storage unit that provides for storage of hundreds of thousands of media items. In order to easily and efficiently locate a media item from amongst such a high volume of media items a user needs to be able to categorize media items and files according to numerous item or file related parameters, such as file type, file creation date, event related to the media file or the like.

Therefore, the need exists to develop a media file user interface application, especially suited for portable digital devices having a small display. The desired application will provide the ability to efficiently and effectively browse media files to locate specific media items. As such, the desired application will present the display of media files and media items in such a manner that is conducive to browsing on device's having small displays. In addition, the desired application will provide for an easily activated search function that provides the user the ability to perform searches based on metadata information related to the media items, user-stored information related to the media items, text within the media item or the like. In addition, the desired application will present search results in a form that is highly user-friendly and is especially suited to small sized displays.

BRIEF SUMMARY OF THE INVENTION

The present invention provides for a user interface (UI) application that provides access to media items and media files and provides browsing and search capabilities for locating media items within media files. The UI application of the present invention relies on a hierarchical display of various levels or categories of media files and, as such, the application is uniquely suited for portable digital devices having small displays. The hierarchal display of media file levels allows the user to easily browse through levels to identify a desired media file and to locate and display a desired media item. In addition, the UI application of the present invention provides for an easily activated search function that provides for keyword searches to be performed based on information that has been associated with media files and media items. As a further benefit, the application provides for the visual presentation of search results in a manner that is highly user-friendly and allows the user to efficiently browse the search results to locate the desired media item.

In one embodiment of the invention, a user-interface (UI) application for providing access to media items on a display of a digital device is defined. The UI application including a computer readable storage medium having computer-readable program instructions embodied in the medium. The computer-readable program instructions include first instructions for generating a media management view of one or more media item classification levels, wherein each level includes multiple media item icons and second instructions for defining a focus point within one of the media item classification levels, wherein the focus point has a fixed position within the view and selects one icons within the level for presentation of the media items associated with the icon.

The first instructions will typically provide for the media item classification levels to be configured in the view as horizontally oriented bars. In such a configuration, each of the bars will include multiple media item icons displayed horizontally. In one embodiment the media item classification levels will include a first level having a selected icon occupying the focus point of the display and a second level in which the icons in the second level are related to the selected icon in the first level. In such an embodiment, the first instructions may provide for activating the selected icon in the first level to scroll from the first level to the second level and provide for a second level media icon to occupy the focus point.

In one embodiment of the invention the media item classification levels include a first level that may include a timeline icon, a media album icon and a people icon. The timeline icon will typically be associated with a second level that includes multiple media item icons that are displayed along a timeline. In this regard, a user of the application can move from the first level timeline icon to the second level and scroll through the icons to locate a particular media item based on the time that the media item was created, received or otherwise date stamped for inclusion in the timeline.

The media album icon will typically be associated with a second level that includes multiple media album-specific icons. The media album-specific icons may be defined by metadata associated with stored media items or they may be defined by user preference. For example, a media album-specific icon may be associated with a particular event and the album will typically include all of the media items associated with the event. Access to the media items associated with the media album specific icon may be possible through an additional media item classification level.

The people icon will typically be associated with a second level that includes one or more people-specific icons. The people-specific icons will be associated with a specific individual or group of individual. Access to the media items associated with the person or group may be possible through an additional media item classification level.

The second instructions will typically provide for the focus point being aligned with a vertical centerline of the display. Additionally, the second instructions typically provide for the presentation to be defined as an enlarged presentation window that may also be aligned with the vertical centerline of the display.

The computer-readable program instructions of the UI application may additionally include third instructions for scrolling the media item icons within a level into the focus point. Alternatively, the third instructions may provide for scrolling the one or more media item classification levels such that a media item icon from one of the scrolled levels is scrolled into the focus point or, the third instructions may provide for scrolling in a first direction to move the one or more media item icons within a level into the focus point and scrolling in a second direction to move a media item icon from another level into the focus point.

The computer-readable program instructions of the UI application may additionally include instructions for activating a search window that is displayed in conjunction with the media management view and instructions for displaying search results in a search result level that includes media item icons associated with the search results. Additionally, the focus point may be defined within the search result level and may initially select a generic icon for display within the focus point. The generic icon will typically be associated with search result information.

The invention may also be embodied within a user interface (UI) application for locating media items on a digital device. The UI application includes a computer readable storage medium having computer-readable program instructions embodied in the medium. The computer-readable program instructions include first instructions for generating a search input field on a display of the digital device and second instructions for generating a search result level that includes one or more icons, wherein each icon is related to search result media items.

In specific embodiments, the search input field that is generated by the first instructions may be configured such that it overlays a media management view having one or more media item classification levels, with each level including multiple media item icons. In addition, the search input field will typically be a keyword input field.

The second instructions of the UI application may define the search result level as a horizontally oriented bar having search result item icons located along the bar. The second instructions may additionally include instructions for providing a search result information icon that is located at a focus point within the search result level. The search result information icon is typically displayed upon initial display of the search results. Additionally the second instructions may provide instructions for generating a search result presentation window displayed when the search result information icon is located at the focus point. The search result presentation window may include search result information entries, such as a breakdown of media file types or the like, which are typically selectable. Selection of a search result information entry typically results in generation of a second search result level that includes multiple icons, with each of the icons are related to the selected detailed search result information.

In another embodiment of the invention, a digital device is defined. The digital device includes a processing unit that executes computer-readable program instructions for accessing media files. The computer-readable program instructions include first instructions for generating a media management view of one or more media item classification levels. Each of the levels will include one or more media item icons. The computer-readable program instruction will additionally include second instructions for defining a focus point within one of the media item classification levels, wherein the focus point has a fixed position within the view and selects one of the one or more icons within the level for presentation of the one or more media items associated with the icon. The digital device additionally includes a display in communication with the processing unit that presents the media management view. The digital device may be a portable digital device, such as a handheld digital device having a small sized display. Example of possible portable digital devices include a mobile telephone, a personal digital assistant (PDA), an image camera, a video camera, an audio record and playback device, a video player, a portable television, a global positioning system (GPS) device, a wrist watch or the like. Additionally, the digital device may have restricted functionality to control display of the device, for example, a television, a set-top box (STB), an automobile navigation system, an on-board computer (e.g., an automotive computer), a domestic appliance or the like. Typically, the digital device of the present invention will be capable of receiving digital communications, such as electronic mail, short message service (SMS), multimedia message service (MMS) or like. Although, the digital device of the present invention is not required to have digital communication capabilities.

The processor that executes computer-readable program instructions including first instructions further defines the media item classification levels as horizontally oriented bars that each includes one or more media item icons. The first instructions may also provide instructions for generating a first level having a selected icon occupying the focus point and a second level wherein the icons in the second level are related to the selected icon in the first level. In such an embodiment, the first instructions may additionally include instructions for activating the selected icon in the first level to scroll from the first level to the second level and provide for a second level media icon to occupy the focus point.

The processor that executes computer-readable program instructions may additionally include third instructions for scrolling either the media item icons within a level into the focus point or scrolling the media item classification levels such that a media item icon from one of the scrolled levels is scrolled into the focus point. The third instructions may additionally provide for scrolling in a first direction to move the media item icons within the level into the focus point and scrolling in a second direction to move a media item icon from another level into the focus point.

In an alternate embodiment of the present invention, another digital device is defined. The digital device includes a processing unit that executes computer-readable program instructions for accessing media files. The computer-readable program instructions include first instructions for generating a search input field on a display of the digital device and second instructions for generating a search result level that includes one or more icons, wherein each icon is related to search result media item. The digital device will additionally include a display in communication with the processing unit that presents the search input field and the resulting search input level. The digital device will typically be a portable digital device, such as a handheld digital device having a small sized display. Example of possible portable digital devices include a mobile telephone, a personal digital assistant (PDA), an image camera, a video camera, and an audio record and playback device. Typically, the digital device of the present invention will be capable of receiving digital communications, such as electronic mail, short message service (SMS), multimedia message service (MMS) or like. Although, the digital device of the present invention is not required to have digital communication capabilities.

The computer-readable program instructions executed by the UI application may further define the first instructions as defining the configuration of the search input field as overlaying a media management view that have one or more media item classification levels, with each level including one or more media item icons. The first instructions will additionally typically define the search result level as a horizontally oriented bar that includes within the bar the icons related to the search results.

The computer-readable program instructions executed by the UI application may further define the second instructions as including instructions for providing a search result information icon that is located, upon initial display of the search results, at a focus point in the display. The focus point is a fixed point within the display that highlights an icon of interest and provides further information related to the icon of interest in an enlarged presentation window. In the present embodiment when the search result information icon is located at the focus point, the presentation window will include detailed search result information, such as a breakdown of search results by media type or other listings of information related to the search results. In such embodiments, the second instructions of the UI application executed by the processor of the digital device may include instructions for selecting one of the search result information entries, to provide for display of a second search result level that includes one or more icons. Each of the icons in the second search result level may be related to the selected detailed search result information. For example, if the detailed search result information in the presentation window includes media type information, a user may choose to select image files and the second search result level will be limited to media items of the selected type.

Thus, the present invention provides a UI application for managing media files and media items in a digital device. The application utilizes a hierarchal display of levels or categories of media items to allow the user to readily browse through levels and files to locate a media item of interest. The hierarchal nature of the presentation of the media files and items makes the application especially suited for portable digital devices having a small display. In addition, the application provides for an easily activated search function that allows files and media items to be located based on information associated with the media file or item. The results of the search function are presented in a highly user-friendly display that allows the user to readily and efficiently browse the search results to find the media item of interest.

BRIEF DESCRIPTION OF THE DRAWINGS

Figure 1:
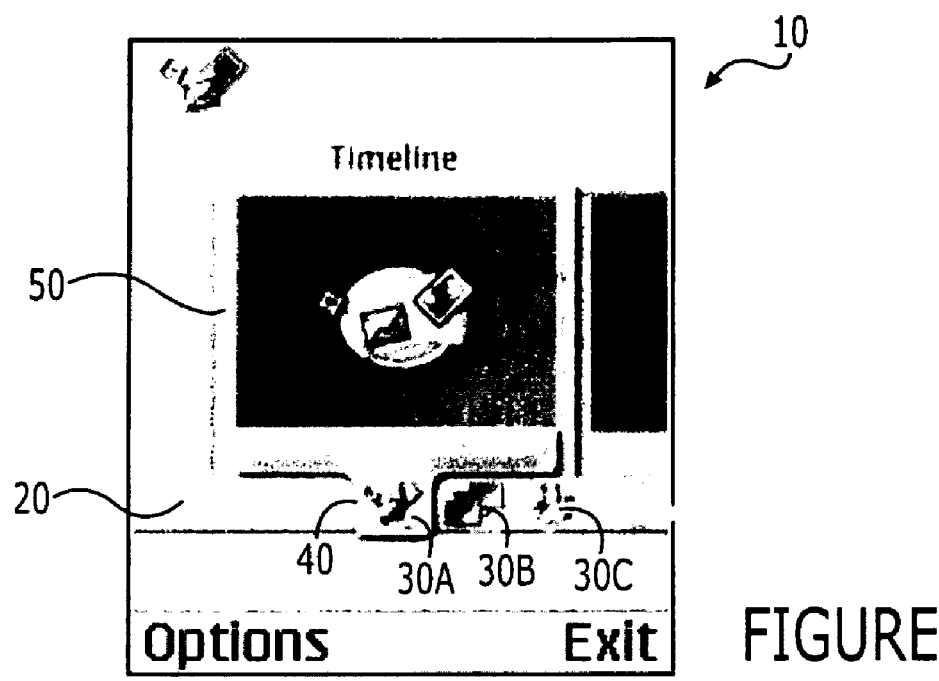

Having thus described the invention in general terms, reference will now be made to the accompanying drawings, which are not necessarily drawn to scale, and wherein:

FIG. 1 is a first level timeline view or screenshot of a media management user-interface (UI) application, in accordance with an embodiment of the present invention.

Figure 2:
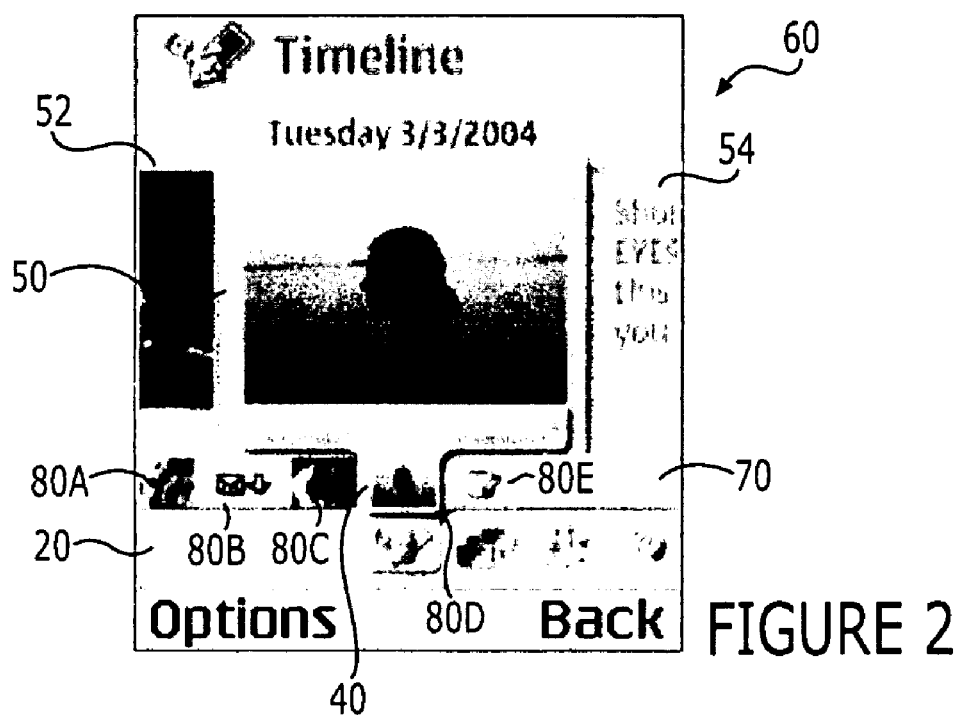

FIG. 2 is a second level timeline view or screenshot of a media management UI application, in accordance with an embodiment of the present invention.

Figure 3:
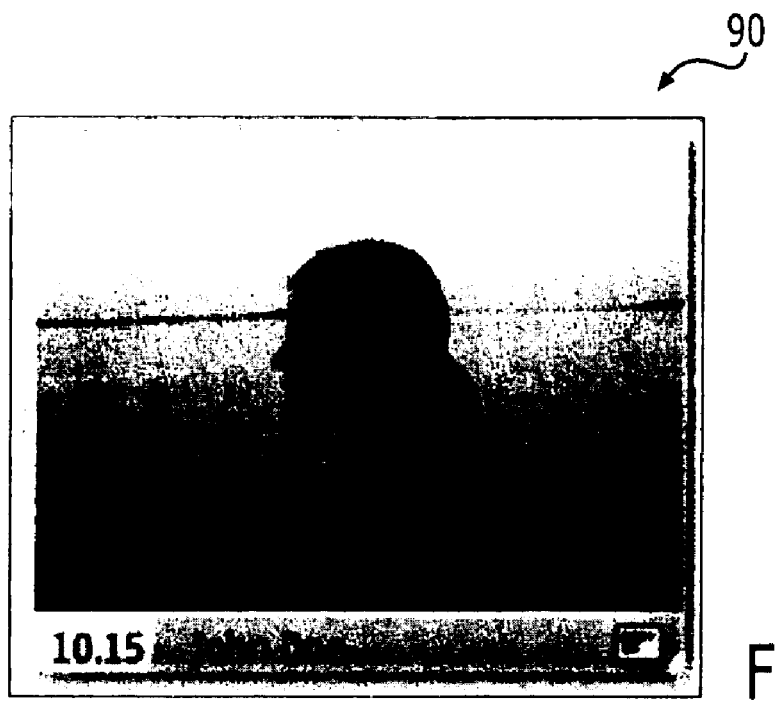

FIG. 3 is a full-screen timeline view or screenshot of a media management UI application, in accordance with an embodiment of the present invention.

Figure 4:
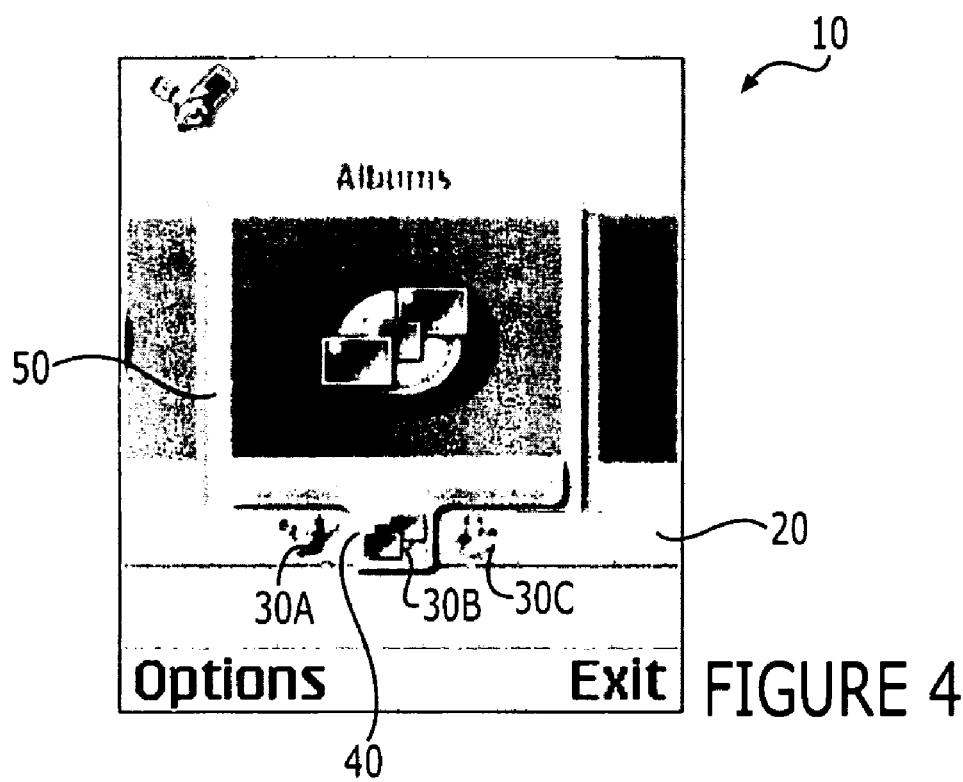

FIG. 4 is a first level media album view or screenshot of a media management UI application, in accordance with an embodiment of the present invention.

Figure 5:
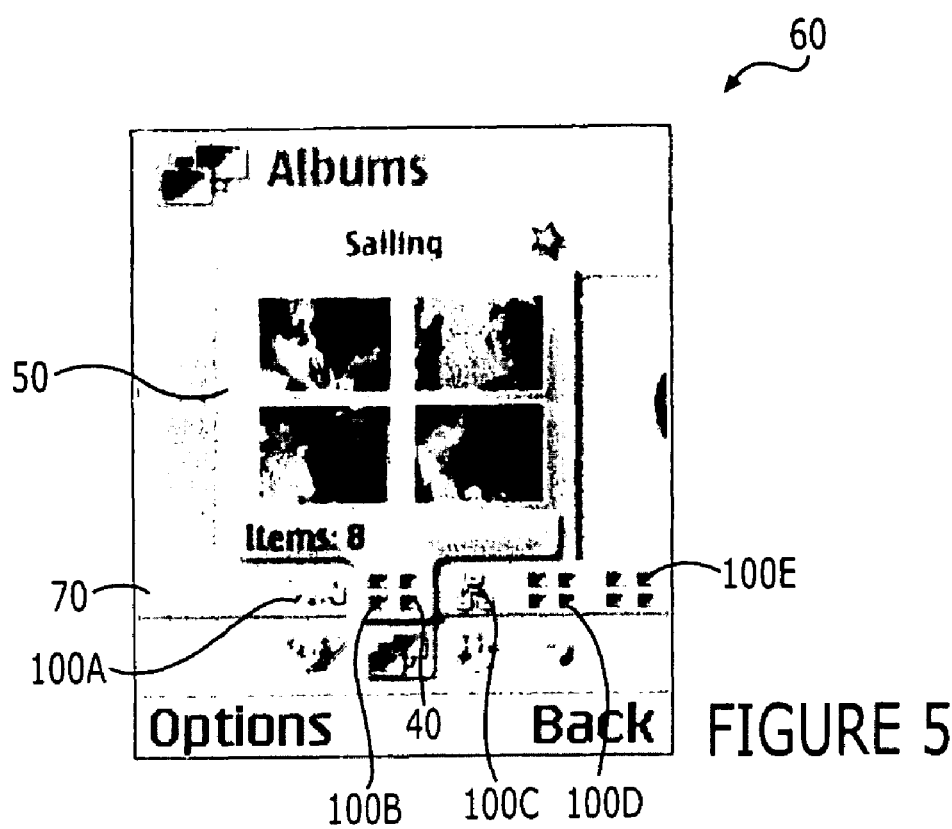

FIG. 5 is a second level media album view or screenshot of a media management UI application, in accordance with an embodiment of the present invention.

Figure 6:
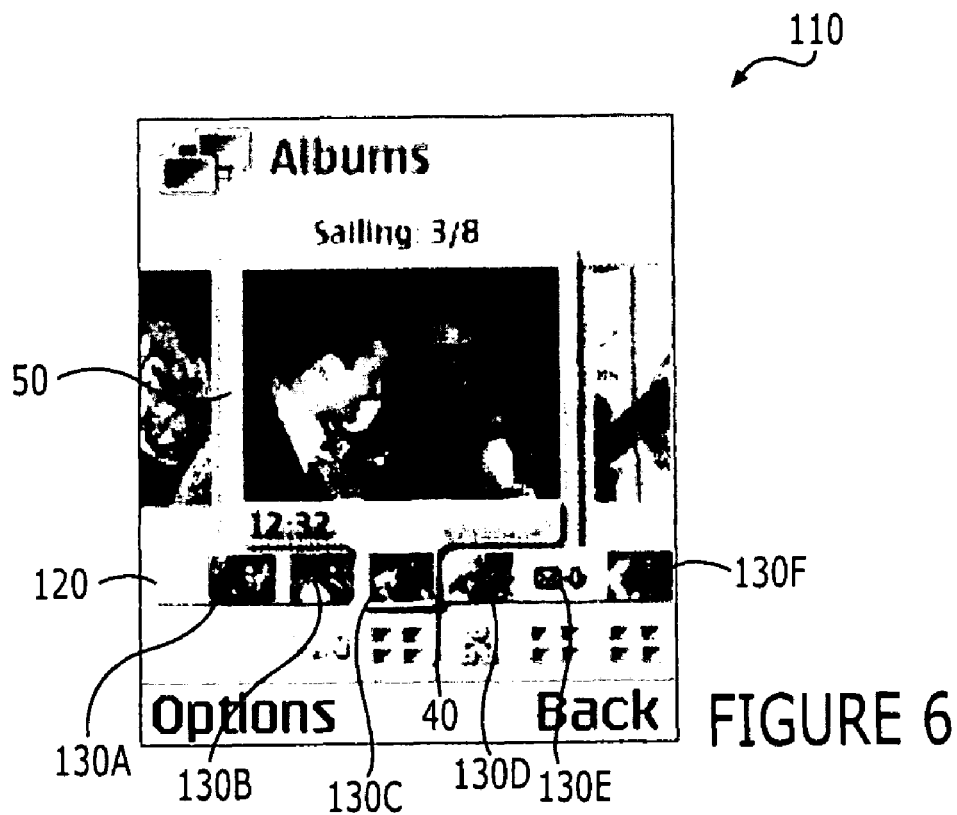

FIG. 6 is a third level media album view or screenshot of a media management UI application, in accordance with an embodiment of the present invention.

Figure 7:
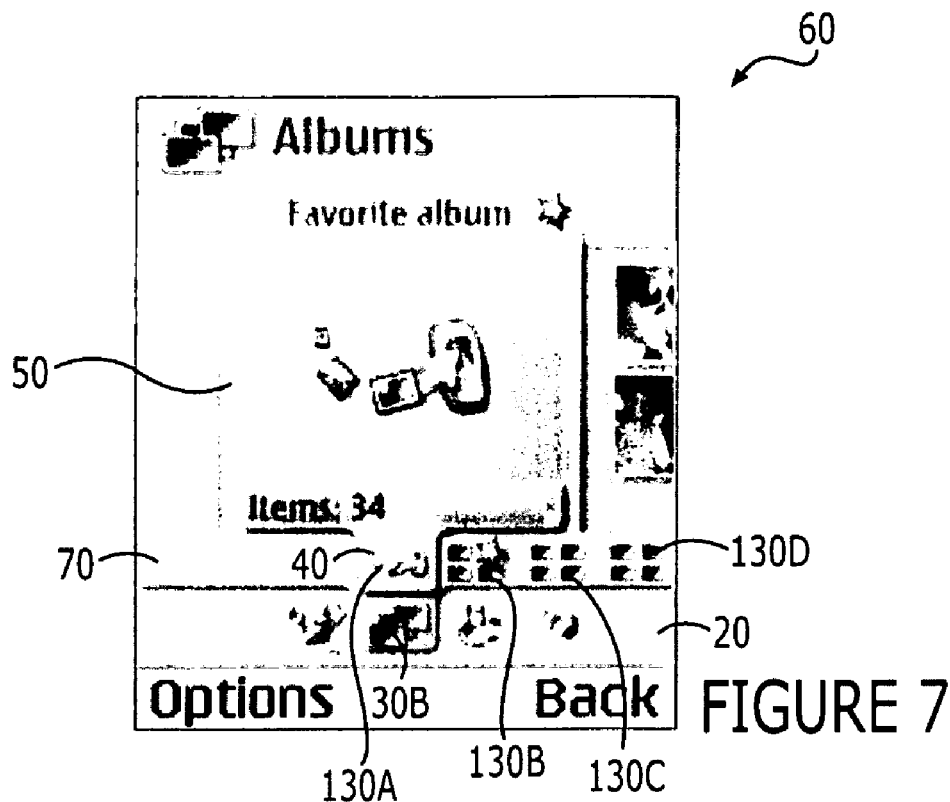

FIG. 7 is a second level media album view or screenshot of a media management UI application, which highlights the favorite album in the focus point and focus information window, in accordance with an embodiment of the present invention.

Figure 8:
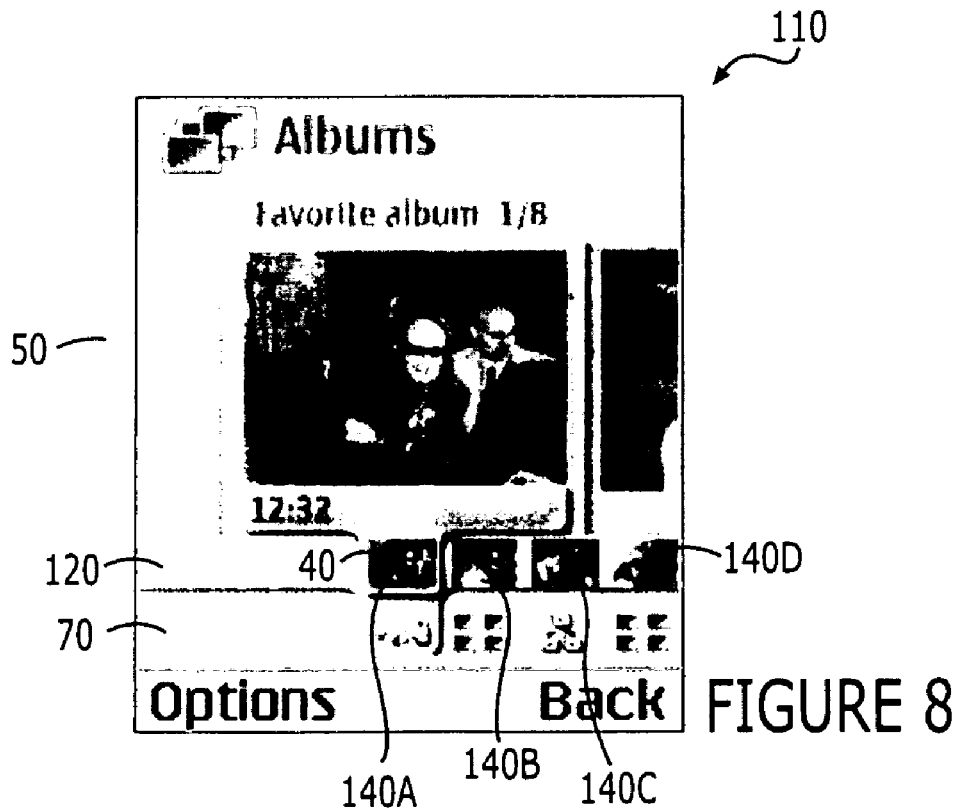

FIG. 8 is a third level media album view or screenshot of a media management UI application, which highlights the favorite album in the focus point and focus information window, in accordance with an embodiment of the present invention.

Figure 9:
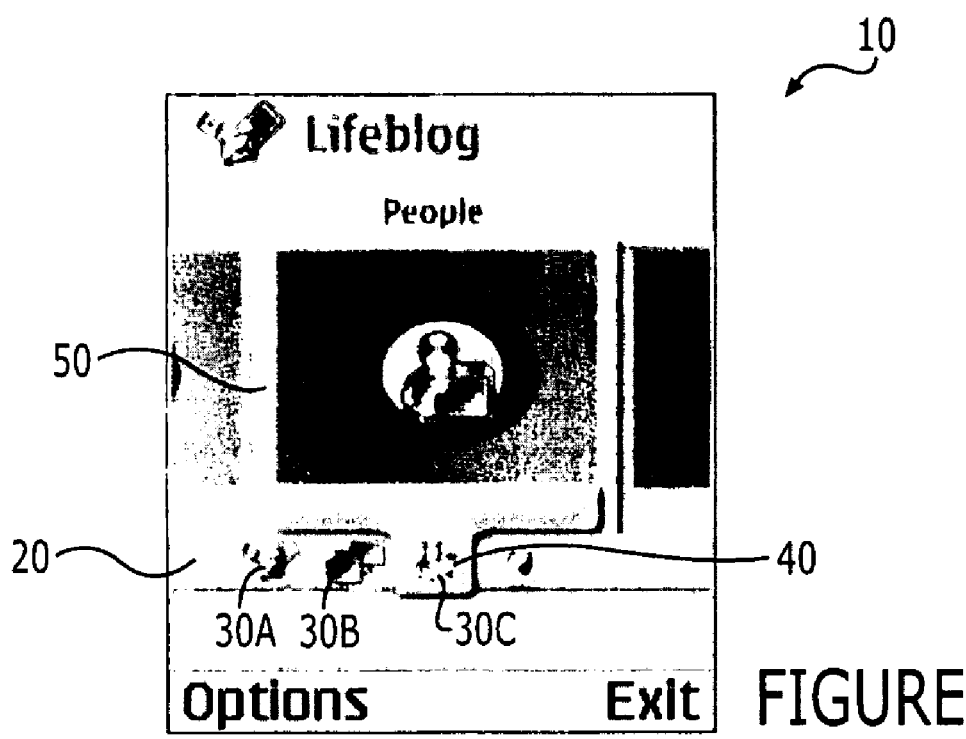

FIG. 9 is a first level people view or screenshot of a media management UI application, in accordance with an embodiment of the present invention.

Figure 10:
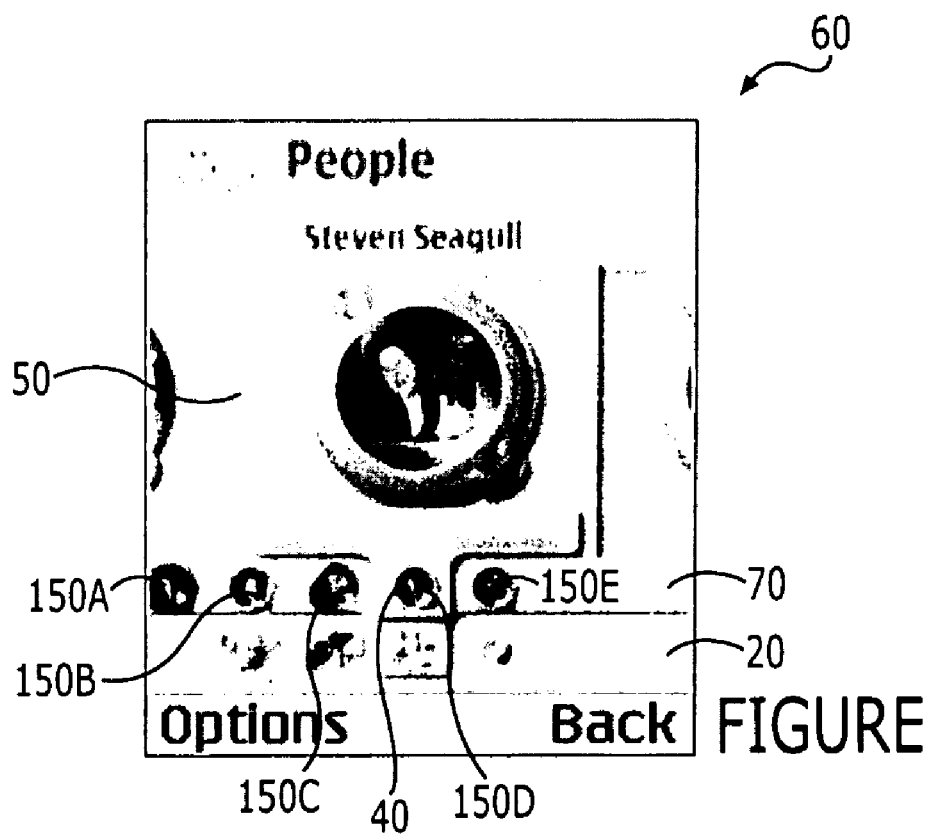

FIG. 10 is a second level people view or screenshot of a media management UI application, in accordance with an embodiment of the present invention.

Figure 11:
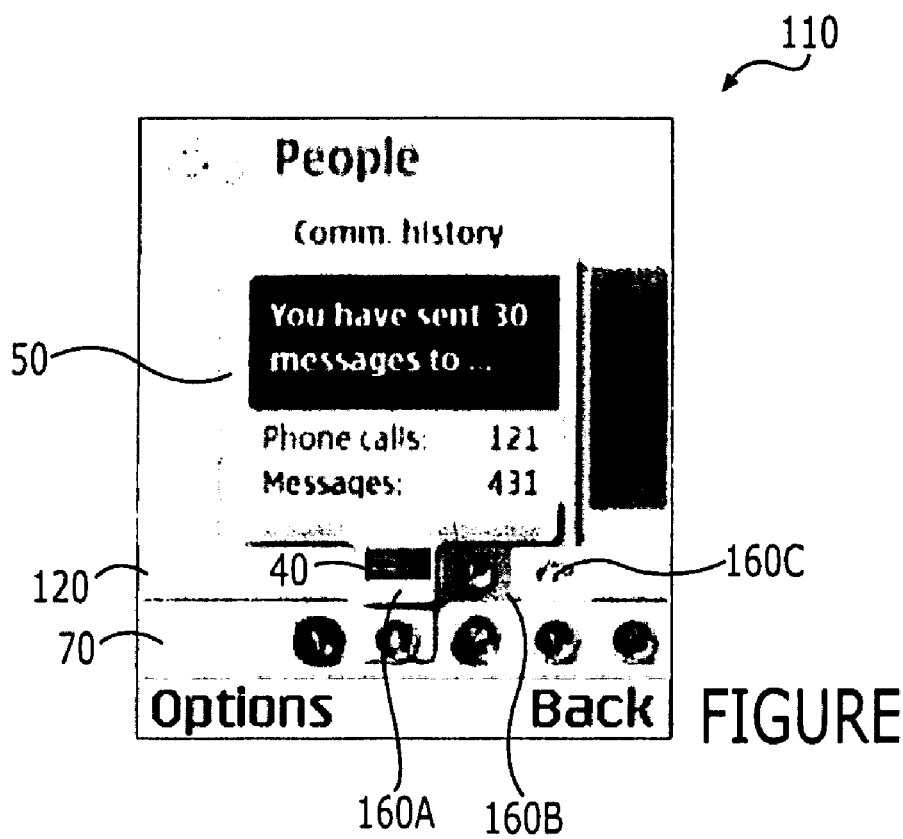

FIG. 11 is a third level people view or screenshot of a media management UI application, in accordance with an embodiment of the present invention.

Figure 12:
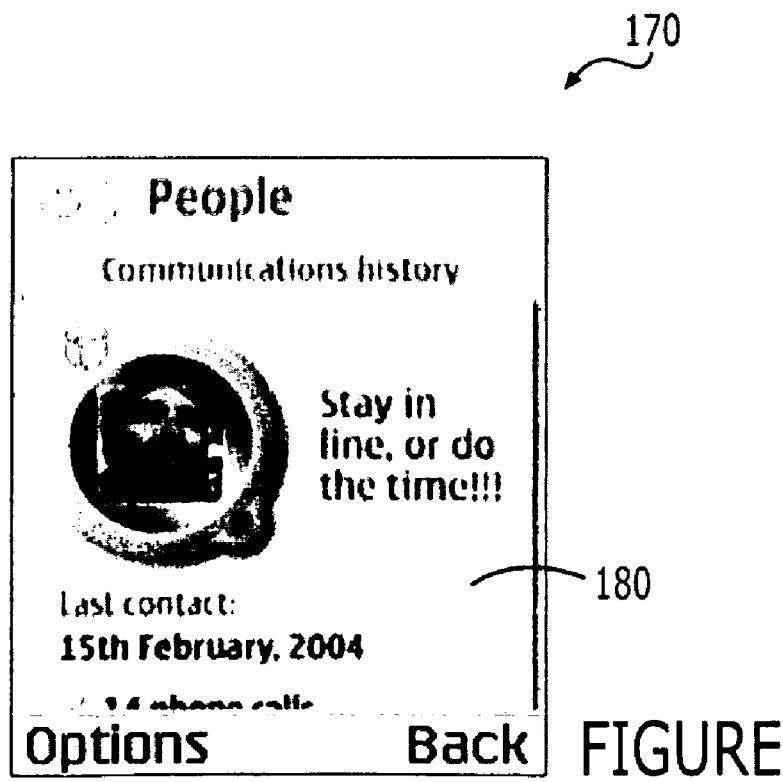

FIG. 12 is a full-screen people view or screenshot of a media management UI application, in accordance with an embodiment of the present invention.

Figure 13:
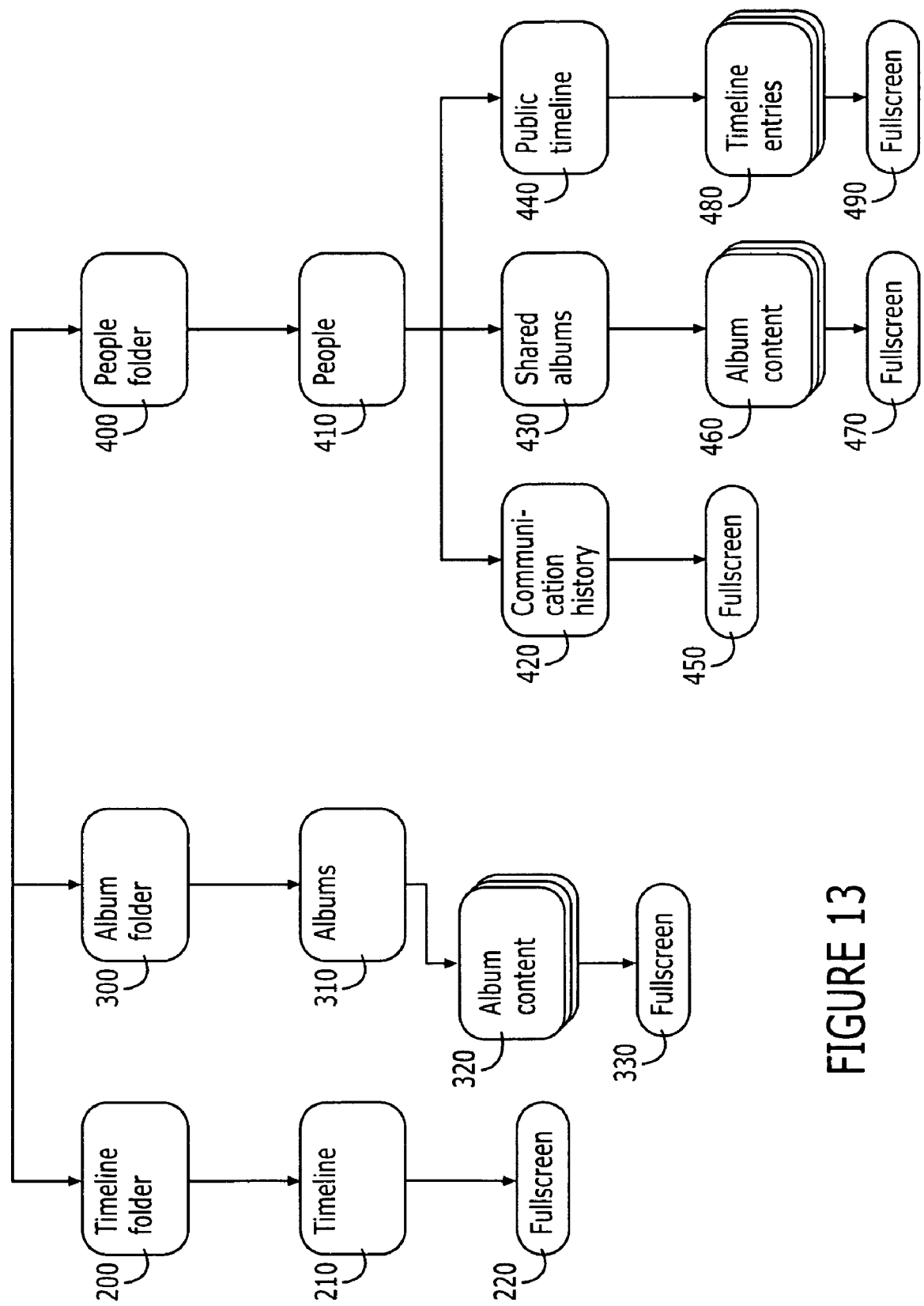

FIG. 13 is a flow diagram of describing an example of various levels and associated content of folders and files in each level of the media management UI application, in accordance with an embodiment of the present invention.

Figure 14:
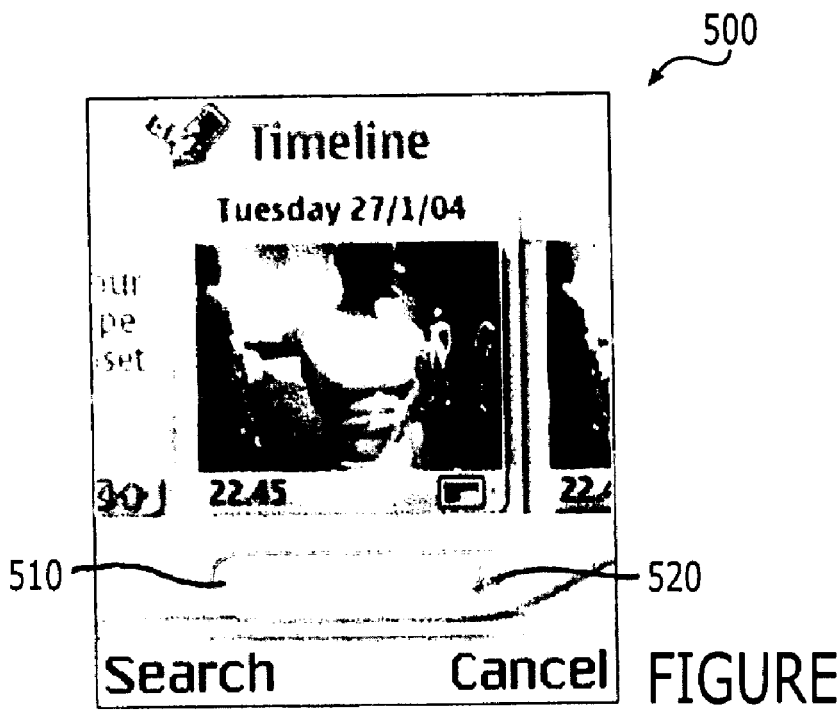

FIG. 14 is a search input view or screenshot of a media management UI application, in accordance with an embodiment of the present invention.

Figure 15:
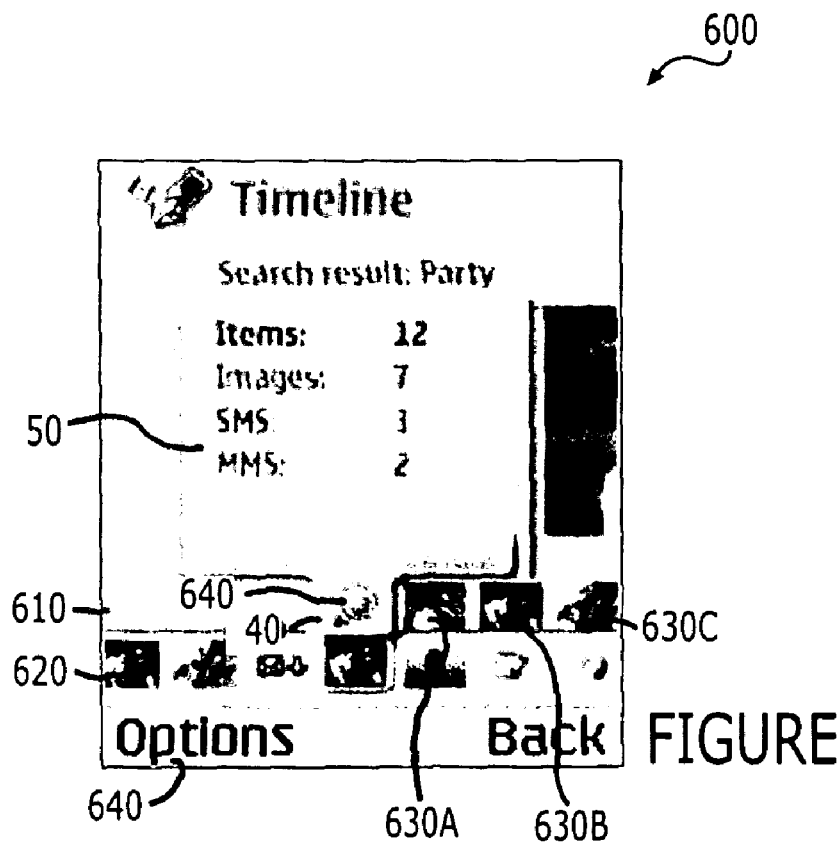

FIG. 15 is a first level search result view or screenshot of a media management UI application, in accordance with an embodiment of the present invention.

Figure 16:
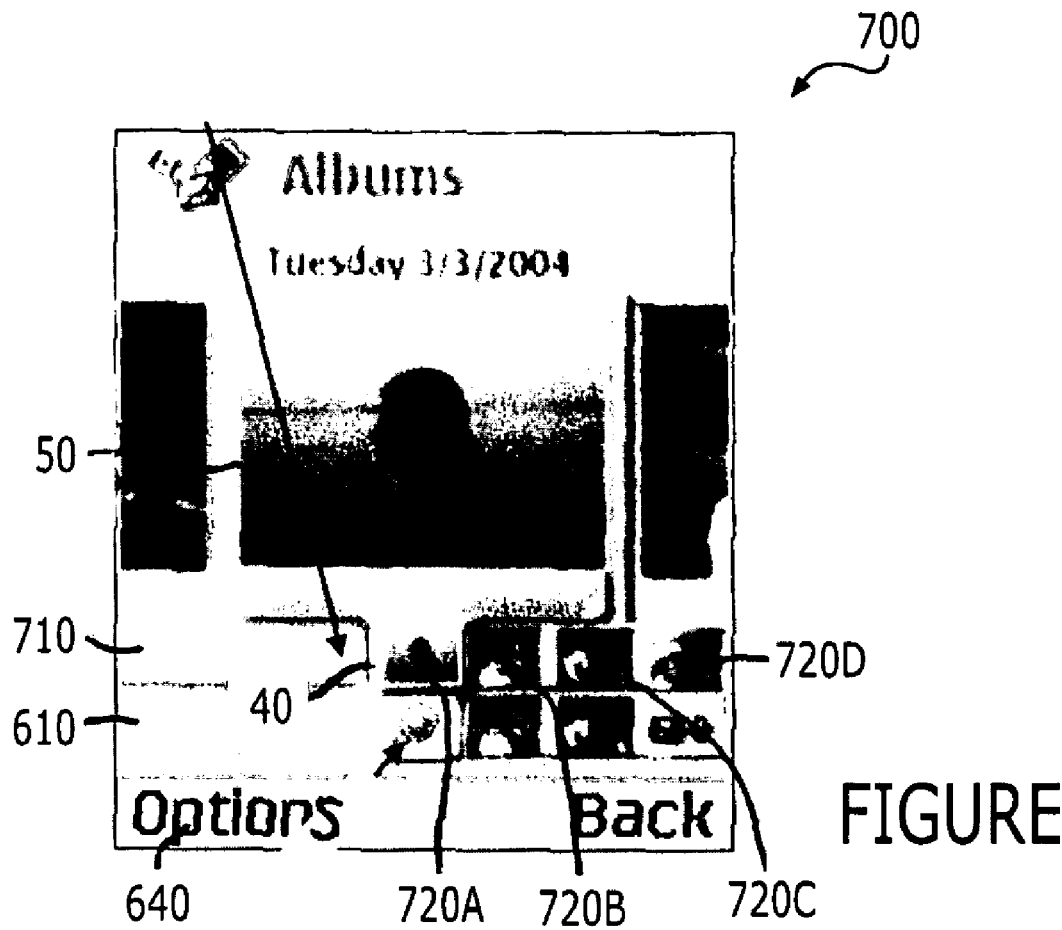

FIG. 16 is a second level search result view or screenshot of a media management UI application, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for a media management user-interface (UI) application for accessing, browsing and searching media files and media items. The application utilizes a hierarchal display of levels or categories of media items to allow the user to readily browse through levels and files to locate a media item of interest. The hierarchal nature of the presentation of the media files and items, along with other presentation features, makes the application especially suited for portable digital devices having a small display. In addition, the application provides for an easily activated search function that allows files and media items to be located based on information associated with the media file or item. The invention additionally provides the benefit of presenting the search results in a highly user-friendly display that allows the user to readily and efficiently browse the search results to find the media item of interest.

FIG. 1 depicts an example of a general user-interface view or screenshot of the media management UI application, in accordance with an embodiment of the present invention. The general concept of the present invention is that it allows for media items, such as image files, video files, audio files, text files, notes messages, electronic mail (email), folders, albums, presentations, maps, data files, calendar entries, functions, commands, icons, thumbnails or the like, to be presented to the user in a hierarchal presentation of levels, referred to herein as media item classification levels. In the illustrated embodiment the media management view 10 includes a first media item classification level 20. The first level 20 is typically the most general level or upper level in a user-interface hierarchy and is the level that the user will typically initially encounter upon activation of the UI application. In the illustrated embodiment of FIG. 1, only the first level is visible, however, as subsequent views will illustrate, multiple levels may be visible within a view. Typically, a view will include anywhere from one level to about three levels, although the inclusion of more levels within a view is possible. In the illustrated embodiment the levels are defined as horizontally oriented bars that appear within the view. However, it is also possible to configure the levels in other manners, such as vertically oriented bars, within the display and the alternate configurations of the levels are within the inventive concepts herein disclosed.

Each level in the media management view will include one or more media item icons 30. In the illustrated embodiment of FIG. 1, the first level 20 includes four media item icons 30A, 30B, and 30C. Each icon is associated with one or more media items. The icons on the first level will typically serve as the root level of various media management folders. Subsequent levels provide for related subfolders. For example, in the illustrated embodiment the first level includes a timeline icon 30A that provides access to further levels that categorize media items according to a timeline; media album icon 30B provides access to further levels that categorize media items according to user designated or application designated album titles; and people icon 30C provides access to further levels that categorize media items according to the person that the media item is associated with. Further details concern each of the illustrated examples of first level icons will be provided below.

It should be noted that the icons presented in the first level 20 of FIG. 1 are by way of example only and, as such, the first level can be configured with other icons without departing from the inventive concepts herein disclosed. In another embodiment of the invention (not illustrated), the first level of the media item classification level may also include a system icon that provides access to further levels of system and device specific functions, such as start, shut down, stand by, close, lock, open, synchronize, etc. Additionally, the first level of the media item classification level may also include a file manager icon that provides access to files through a file hierarchy.

In one embodiment, the media management view 10 will also define a focus point 40 that occupies a fixed position within the display. The horizontal position of the focus point may be aligned with a vertical centerline of the display. The vertical position of the focus point may be determined by the number and positions of the media item classification levels on the display. For example, the vertical position of the focus point may be aligned with a horizontal centerline of the uppermost media item classification level bar. Additionally, the media item classification level bars may have fixed positions or position reservations on the display. Additionally, the number and vertical locations of the media item classification levels may be determined by the type and capabilities of the display, and/or by the type and structure of the user interface hierarchy, and/or selected by a user. Additionally, the vertical position of the focus point may be defined as a certain ratio of the height of the display. For example, a horizontal line describing a level of the focus point may be from ⅓, ¼, ⅕ or any other ratio of the height from a bottom of the display. Alternatively, the focus point may only define a horizontal fixed location and the vertical location may vary along the centerline of the display or the focus point may only define a vertical fixed location and the horizontal location may vary along the centerline of the display.

The focus point is typically highlighted, bordered or otherwise visually distinguished to allow the user knowledge as to the whereabouts of the focus point. One of the icons from one of the levels in the view will occupy the focus point. In the illustrated embodiment the timeline icon 30A occupies the focus point 40. A user of the UI application can scroll the icons in to and out of the focus point. For example, in the illustrated embodiment horizontal scrolling, by use of a joystick, mouse, keyboard input, arrow buttons or the like, will result in moving the icons 30A-C either left or right within the view, resulting in one of the icons occupying the focus point. Focus point occupation by an icon provides access to further levels associated with the icon and provides for information or content associated with the icon to be presented in the focus information window 50. For example, in the illustrated embodiment the user will have access to further levels associated with the timeline icon 30A and, in order for the user to have access to further levels associated with the media album icon 30B or the people icon 30C the user will have to scroll the appropriate icon in to the focus point. In addition to providing access to further levels associated with the icon, the focus point also provides for information associated with the icon or media items associated with the icon to be displayed in the focus information window 50. For example, in the FIG. 1 embodiment, the focus information window provides the title of icon (i.e., timeline) in the focus point 40 and an illustration similar to the icon illustration. In higher levels of the UI application, as discussed infra, the focus information window will display a media item or multiple media items associated with the icon in the focus point. Additionally, any function, such as start, display, run, play, etc., related to an icon in the focus point may be activated, if necessary, by a designated keystroke or button or a menu command. Similar to the focus point, the focus information window will typically have a fixed position within the display, such as aligned with a vertical centerline of the display. Additionally, the focus information window may be adjacent to the focus point. Additionally, the focus information window may be sized and placed to present as much information as possible in the display of a portable or handheld digital device.

In one embodiment, a user of the UI application can scroll the icon in the focus point to access further levels associated with the icon. In the illustrated example of FIG. 1, a user can scroll vertically, by use of a joystick, mouse, keyboard input or the like, to move to a higher or lower level. FIG. 2 provides an example of a media management second level view 60 in which the user has moved up a level from the first level illustrated in FIG. 1 and, specifically the user has moved from the timeline icon 30A in the first level 20 to second level 70 that represents a timeline. As such, in the displayed view of FIG. 2 the first level moves to a position below the second level. If the user chooses to continue to move to a subsequent level, typically by scrolling up, the preceding levels will move downward in the displayed view. The second level, as depicted, is considered the active or accessible level because an icon from the second level occupies the focus point 40, while depiction of first level within the view provides historical information as to the previous level accessed. The previous icon (timeline icon 30A) on the first level may be placed below and adjacent to the focus point. The position below and adjacent to the focus point may be referred to as a history focus, because it indicates previous steps and selections in the UI hierarchy. The adjacent focus points in the adjacent levels depict and describe broader selection history.

The second level depicts one or more media item icons, such as media item icons 80A, 80B, 80C, 80D and 80E. Each of the media item icons in the second level will typically correspond to ant type of media item or an individual media item, such as image item, a video file, an audio file, an email, a SMS message, a MMS message or the like. Additional, icons will typically exist in the second level and may be brought into the view of the display by horizontal scrolling. In the depicted second level the icons are arranged in timeline fashion. For example, icons to the left of the focus point 40 represent media items that preceded in time the media item associated with the focus point icon and icons to the right of the focus point represent media items that followed in time the media item associated with the focus point icon.

In the FIG. 2 embodiment, icon 80D occupies the focus point 40. The icon 80D represents a thumbnail image of the corresponding image file. The focus information window 50 that is associated with icon 80D includes the time associated with the media item, in this example, Tuesday Mar. 2, 2004, and an enlarged depiction of the corresponding image file. Adjacent windows 52 and 54 provide for the display of a portion of the media item associated with the icons 80C and 80E that are adjacent to the focus point icon 80D. In this regard, if a user scrolls the second level, horizontally to the right, such that the icon 80E occupies the focus point, then the media item associated with icon 80E (i.e., a portion of the text of an SMS message) will be displayed in the focus presentation window.

If the user of the UI application desires a full-screen view of the corresponding media item, the user may scroll vertically upward, in effect, moving up to the next level, to provide the full view 90 that is depicted in FIG. 3. In a handheld digital device having a small display size, full-screen presentation of the image will typically involve rotating the image 90° to accommodate the dimensions of the image in relation to the dimensions of the display. A user may move from the full-screen view of FIG. 3 to the view depicted in FIG. 2, by scrolling downward, in effect, moving back down to the second level. Further, a user may choose to move from the view depicted in FIG. 2 to the view depicted in FIG. 1, by additional downward scrolling, in effect moving access from the second level to the first level.

FIGS. 4-8 provide depictions of examples of the media management levels associated with the media album folder, in accordance with embodiments of the present invention. For example, FIG. 4 illustrates a media management view 10 in which the first level 20 is accessible and the media album icon 30B occupies the focus point 40. A user will move from the first level view 10 of FIG. 4 to the second level view 60 of FIG. 5, typically by performing a scroll function and, specifically, a vertical scroll function. The second level 70 will have one or more icons that represent media albums. The media albums may be defined by a user or defined by metadata associated with media items. For example, a media album may be associated with an event, a date, a topic, a location or any other user or metadata designated category. In the illustrated example of FIG. 5, icons 100A, 100B, 100C, 100C and 100E are depicted and the 100B icon occupies the focus point 40. Horizontal scrolling from within the second level will change the icon in the focus point and may provide for additional icons to be displayed in the second level view. The 100B icon that occupies the focus point is associated with information displayed in the focus information window 50. For example, in the FIG. 5 embodiment the focus information window includes the title of the album, a thumbnail images of a portion of the media items in the album and the number of items in the album.

If the user desires to access the individual items in an album, the user will move from the second level view 60 of FIG. 5 to a third level view 110, as depicted in FIG. 6. The third level 120 will have one or more icons that represent the individual media items in the media album. In the illustrate example of FIG. 6, icons 130A, 130B, 130C, 130D, 130E and 130F are depicted and icon 130C occupies the focus point 40. Horizontal scrolling from within the third level will change the icon in the focus point and may provide for the additional media item icons to be displayed in the third level view, depending on how many media albums exist in the second level. The 130C icon that occupies the focus point is a thumbnail image of the larger image that is displayed in the focus information window 50. In addition to the larger image, the focus information window may include other relevant information such as the title of the album, and a timestamp for the media item. Typically, the items in the album will be arranged within the third level according to time, for example, the earliest in time media item may initially occupy the focus point and horizontal scrolling within the third level will provide for presentation of later in time media items. Alternatively, the media items may be arranged alphabetically or by a user's designated preference of arrangement.

If the user of the UI application desires a full-screen view of the media item shown in the focus information window 50, the user may scroll vertically upward, in effect, moving up to the next level. In a handheld digital device having a small display size, full-screen presentation of the image will typically involve rotating the image 90° to accommodate the dimensions of the image in relation to the dimensions of the display. A user may move from the full-screen view to the third level view depicted in FIG. 6, by scrolling downward, in effect, moving back down to the third level. Subsequent vertical scrolling downward would move the view from the third level view to the second level view and the first level view.

FIGS. 7 and 8 provide illustrations of media management views of the UI application, in which the media album is further defined as a user's favorite album, in accordance with an embodiment of the present invention. FIG. 7 is illustrative of a second level view 60 having a favorite album icon 130A occupying the focus point 40. Typically, the UI application will be configured such that as the user moves from the first level media album icon 30B to the second level view, the favorite album icon 130A will be the icon that initially occupies the focus point. The favorite album will typically be user designated and it will include those media items that a user has prioritized as being of heightened interest, i.e., favorite. In the second level view, the corresponding focus information window 50 provides information related to the favorite album, such as album title, the number of items included in the album and the like.

By vertically scrolling from the focus point position, the user will move from the second level view 60 of FIG. 7 to the third level view 110 of FIG. 8. The third level 120 will have one or more icons that represent the individual media items in the favorite album. In the illustrate example of FIG. 8, icons 140A, 140B, 140C, and 140D are depicted and icon 140E occupies the focus point 40. Horizontal scrolling from within the third level will change the icon in the focus point and will provide for the additional media item icons to be displayed in the third level view. The 140A icon that occupies the focus point is a thumbnail image of the larger image that is displayed in the focus information window 50. In addition to the larger image, the focus information window may include other relevant information such as the title of the album, a timestamp for the media item or any other metadata information.

FIGS. 9-12 provide depictions of examples of the media management levels associated with people folder, in accordance with embodiments of the present invention. For example, FIG. 9 illustrates a media management view 10 in which the first level 20 is accessible and the people icon 30C occupies the focus point 40. A user will move from the first level view 10 of FIG. 9 to the second level view 60 of FIG. 10, typically by performing a scroll function and, specifically, a vertical scroll function. The second level 70 will have one or more icons that represent individual person-specific or group-specific folders. Typically the user of the UI application will designate a person or group for inclusion in the person-specific or group-specific folders. In the illustrated example of FIG. 10, icons 150A, 150B, 150C, 150D and 150E are depicted and the 150D icon occupies the focus point 40. Horizontal scrolling from within the second level will change the icon in the focus point and may provide for additional icons to be displayed in the second level view, depending on the number of person-specific folders that exist in the second level. The 150D icon that occupies the focus point is associated with information displayed in the focus information window 50. For example, in the FIG. 10 embodiment the focus information window includes the person or groups name, a thumbnail image of a portion of a media item within the folder and the like.

If the user desires to access the individual items in a person-specific or group-specific folder, the user will move, typically by vertical scrolling, from the second level view 60 of FIG. 10 to a third level view 110, as depicted in FIG. 11. The third level 120 will have one or more icons that represent various information related to the specified person or group. In the illustrate example of FIG. 11, icons 160A, 160B, and 160C are depicted and icon 160A occupies the focus point 40. Horizontal scrolling from within the third level will change the icon in the focus point and may provide for additional person or group related icons to be displayed in the third level view. The 160A icon that occupies the focus point is a thumbnail image of the larger image that is displayed in the focus information window 50. The focus information window includes information related to the communication history for the person or group. For example, the communication history may include the number of communications that have been sent to the individual or group, a breakdown of communications by type or the like.

In addition to the communication history icon, the third level of the people folder may include a shared item icon and a public timeline icon. The shared item icon is associated with a shared media item folder that includes media items that have been shared between the user and the individual. Sharing may be private (i.e., exchanged via email, MMS or the like) or the sharing may be public (i.e., stored at a publicly accessible server or the like). Further levels within the UI application will provide access to the shared media items. The public timeline icon is associated with person-related or group-related media items that have been communicated to a public timeline, such as a public server that is accessed via a public network, such as the Internet. Further levels within the UI application will provide access to the person or group related media items that have been communicated to the public timeline.

Referring to FIG. 11, and specifically the communication history icon 160A occupying the focus point 40, if the user of the UI application desires a more information related to the communication history and/or the person or group, the user may scroll vertically upward, in effect, moving up to the next level, such as depicting in the fourth level view 170 of FIG. 12. The full-screen communication history 180 depicted in FIG. 12 provides communication history information, such as, last contact date/time, breakdown of communications/media items by type (i.e., messages, telephone calls, images, etc.), and the like. In addition, the full-screen communication history may include contact and/or personal information, such as the individual's address, telephone number(s), family member names, and the like. A user may vertically scroll the full-screen communication history to display more information in the full-screen view.

FIG. 13 provides an example of the flow of levels for folders within a media management UI application, in accordance with an embodiment of the present invention. In the illustrated example, the entry level or first level includes the timeline folder 200, the media album folder 300 and the people folder 400. It is noted that the first level of the UI application may include more or less folders or media items and the number of folders present in the first level will typically be dictated by user preference or by the standard configuration of the media management application.

The timeline folder 200 will provide access to a second level that includes the media item timeline 210. The media item timeline include icons for individual media items arranged in timeline fashion. The media item timeline will provide access to a third level that includes a full-screen 220 presentation of any one of the items in the media item timeline.

The media album folder 300 will provide access to a second level that includes the individual albums 310. The individual albums will be represented by icons displayed in the second level and access to the contents of the albums will be provided through the focus point. The individual albums will provide access to a third level that includes the media item content 320 for each album. The media item content includes icons for each media item included in the album. Each media item in the album will provide access to a fourth level that includes a full-screen 330 presentation of any one of the items in the media item timeline.

The people folder 400 will provide access to a second level that includes the individual person or group file 410. The individual person or group files will be represented by icons displayed in the second level and access to the contents of a file will be provided through the focus point. The individual person or group file will provide access to a third level that may include the communication history file 420, the shared album file 430 and the public timeline entry 440. The communication history file 420 will typically include information relate to communications between the user and the specified person, including the number of communications, the breakdown as to type of communications. In addition, the communication history file may include contact or personal information associated with the specified person. The focus information window will provide display of the communication window and may be enlarged to provide further information, such as a fourth level presentation of a full-screen communication history 450.

The shared album file 430 will provide access to a fourth level that will typically include the shared media items 460 that have been shared, either publicly, privately or both, between the user and the specified person. Each individual shared media item will provide access to a fifth level that includes a full-screen 470 presentation of the shared media item. The public timeline file 440 will provide access to a fourth level that will include a timeline 480 of publicly available media items associated with the specified person. The timeline includes icons for individual media items arranged in timeline fashion. The timeline of publicly available media items will provide access to a fifth level that includes a full-screen 490 presentation of a chosen media item.

FIGS. 14-16 provide illustrations of media management UI application screenshots or views, which highlight the search function, in accordance with an embodiment of the present invention. In the FIG. 14 illustration a search entry view 500 provides for a search entry field 510 will typically be generated on the display by user activation, such as by keystroke of any alphanumeric key. The search engine field may be displayed such that it overlays the underlying one or more of the media item classification levels in the media management views detailed above. The search will typically occur within a selected media item, such as a folder, a collection, a database, an album or the like, on the level that the user of the UI application currently resides. For example, if the user desires to limit the search to within an individual person file, the user will access the appropriate level, scroll the specific icon of the individual person file to the focus point and then activate the search function. In this same regard, if the user desires to perform a search of the entire media item database, the user will access the base level or first level, scroll the specific icon to the focus point and then activate the search function.

In the illustrated embodiment the search entry field is a standard keyword search function that performs Boolean type searches, although other types of searching not limited to keyword searches may also be provided for without departing from the inventive concepts herein disclosed. A user will enter an appropriate keyword and activate the search via the search activation icon 520. Activation of the search will result in display of a search result view, such as shown in FIG. 15.

The search result view 600 of FIG. 15 provides for a search result level 610, displayed in the form of a horizontally oriented bar that is located adjacent to the previous level 620 that was being accessed by the user prior activating the search function. The search result level will include one or more icons 630A, 630B and 630C that are each associated with a search result. Additionally, the search result level will include a search result information icon 640 that will typically occupy the focus point 40 upon initial display of the search results. The search result information icon provides for search result information to be displayed in the focus information window 50 when the information icon occupies the focus point. In the illustrated embodiment the focus information window includes the term searched, the total number of search results and a breakdown of search results by media item type. Further information, may be included in the focus information window and will typically be displayed in the window by providing for a vertical scroll function.

The search result information in the focus information window 50 will typically be selectable to allow for a further level to be presented that narrows the search results. For example, in the FIG. 15 illustration the "images" entry may be scrolled and selected to provide for the display of search results that are limited to only image files. FIG. 16 provides an illustration of the search result view 700 that results from selection of an entry from the information in the focus information window 50. A second search result level 710 is displayed that is located adjacent to the initial search result level 610. The second search result level will include one or more icons 720A, 720B, 720C and 720D that are each associated with an individual search result of the file type selected from the focus information window. In the illustrated embodiment the user selected "images" from the focus information window and, thus, the second search result level is limited to the image files that include the searched term. The icon 720A occupies the focus point 40 and is associated with the focus information window. The focus information window in this view will typically include an enlarged portion of the image file and a timestamp.

If the user of the UI application desires a full-screen view of the searched image file shown in the focus information window 50, the user may scroll vertically upward, in effect, moving up to the next level. In a handheld digital device having a small display size, full-screen presentation of the image will typically involve rotating the image 90° to accommodate the dimensions of the image in relation to the dimensions of the display.

Additionally, search results can be stored for later access. Typically, the options icon 640, illustrated in FIGS. 15 and 16, will provide for a drop-down menu to be displayed that provides for the UI application to store the search result. Subsequent access to the stored search results is also typically provided by the options menu.

Thus, the present invention provides a media management user-interface (UI) application and related devices and methods that provide access to media items and media files and provides browsing and search capabilities for locating media items within media files. The UI application of the present invention relies on a hierarchical display of various levels or categories of media files and, as such, the application is uniquely suited for portable digital devices having small displays. The hierarchal display of media file levels allows the user to easily browse through levels to identify a desired media file and to locate and display a desired media item. In addition, the UI application of the present invention provides for an easily activated search function that provides for keyword searches to be performed based on information that has been associated with media files and media items. Thus, the application provides for the visual presentation of search results in a manner that is highly user-friendly and allows the user to efficiently browse the search results to locate the desired media item.

In general, the present invention provides a user-interface (UI) and related devices and methods that provide access to items, such as commands or data files, of the UI and provides browsing and search capabilities for locating the items within the UI and in a memory of a device. The UI of the present invention relies on a hierarchical display of various levels or categories of items and, as such, the UI is uniquely suited for portable digital devices having small displays or devices having limited control function to control their displays. The hierarchal display of item levels allows the user to easily browse through levels to identify a desired item and to locate, display or activate a desired item. In addition, the UI of the present invention provides for an easily activated search function that provides for keyword searches to be performed based on information that has been associated with items. Thus, the UI provides for the visual presentation of search results in a manner that is highly user-friendly and allows the user to efficiently browse the search results to locate the item.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer readable medium storing computer executable instructions for a user-interface application for providing access to media items on a display of a digital device, the computer executable instructions comprising:

first instructions for generating a media management view of one or more media item classification levels for each of a plurality of different categories of media items, wherein each level includes one or more media item icons, and wherein a media item classification level of one category of media items includes a media item classification level of another category;

second instructions for defining a focus point within one of the media item classification levels, wherein the focus point has a fixed position within the view and selects one of the one or more icons within the level for presentation of the one or more media items associated with the icon; and third instructions for generating, in response to a search, a search result level that includes one or more icons, wherein each icon is related to at least one search result media item and wherein the search result level also includes a search result information icon configured to occupy the focus point so as to selectably allow for display of search result information defining categories providing results from the search and indicating a quantity of corresponding media items in each category providing results from the search.

2. The computer readable medium of claim 1, wherein the first instructions for generating the media management view of one or more media item classification levels further defines the levels as horizontally oriented bars that each includes one or more media item icons.

3. The computer readable medium claim 1, wherein the first instructions for generating the media management view of one or more media item classification levels further provides for a first level that includes a timeline icon.

4. The computer readable medium of claim 3, wherein the first instructions for generating the media management view of one or more media item classification levels further provides for a second level associated with the timeline icon that includes one or more media item icons displayed along a timeline.

5. The computer readable medium claim 1, wherein the first instructions for generating the media management view of one or more media item classification levels further provides for a first level that includes a media album icon.

6. The computer readable medium of claim 5, wherein the first instructions for generating the media management view of one or more media item classification levels further provides for a second level associated with the media album icon that includes one or more media album specific icons.

7. The computer readable medium of claim 6, wherein the second instructions provides for a second level associated with the media album icon that includes one or more media album specific icons, wherein the media album specific icons are defined by metadata associated with media items.

8. The computer readable medium of claim 6, wherein the second instructions provides for a second level associated with the media album icon that includes one or more media album specific icons, wherein the media album specific icons are defined by user-preference.

9. The computer readable medium of claim 8, wherein the second instructions provides for a second level associated with the media album icon that includes one or more media album specific icons, wherein one of the media album specific icons is defined as a user preferred media album.

10. The computer readable medium of claim 1, wherein the first instructions for generating the media management view of one or more media item classification levels further provides for a first level that includes a people icon.

11. The computer readable medium of claim 10, wherein the first instructions for generating the media management view of one or more media item classification levels further provides for a second level associated with the people icon that includes one or more people specific icons, wherein each people specific icon is associated with one or more people-specific media items.

12. The computer readable medium of claim 1, wherein the second instructions for defining the focus point within one of the media item classification levels, wherein the focus point has a fixed position within the view and selects one of the one or more icons within the level for presentation of the one or more media items associated with the icon further defines the focus point as aligned with a vertical centerline of the display.

13. The computer readable medium of claim 1, wherein the second instructions further defines the fixed position of the focus point as aligned with a horizontal centerline of the uppermost media item classification level.

14. The computer readable medium of claim 1, wherein the second instructions further defines the focus point as aligned with a vertical centerline of the display, aligned with a horizontal centerline of the uppermost media item classification level and positioned at a crossing of the vertical centerline and the horizontal centerline.

15. The computer readable medium of claim 1, wherein the second instructions further defines the focus point as aligned with a vertical centerline of the display, aligned with a horizontal centerline of the media item classification level placed on a certain ratio of a height of the display, positioned at a crossing of the vertical centerline and the horizontal centerline.

16. The computer readable medium of claim 1, further comprising fourth instructions for scrolling the one or more media item icons within the level into the focus point.

17. The computer readable medium of claim 1, further comprising fourth instructions for scrolling the one or more media item classification levels such that a media item icon from one of the scrolled levels is scrolled into the focus point.

18. The computer readable medium of claim 1, further comprising fourth instructions for scrolling in a first direction to move the one or more media item icons within the level into the focus point and scrolling in a second direction to move a media item icon from another level into the focus point.

19. The computer readable medium of claim 1, further comprising fourth instructions for scrolling in a first direction to move the one or more media item icons within a first level into the focus point and scrolling in a second direction to move a media item icon from a second level into the focus point.

20. The computer readable medium of claim 19, wherein the second level is placed going through the focus point and the first level is placed underneath and adjacent to the second level.

21. The computer readable medium of claim 20, wherein on the first level a media item icon that was previously in the focus point is placed underneath and adjacent to the focus point.

22. The computer readable medium of claim 1, wherein the second instructions for defining a focus point having a fixed-position within the first media item classification level that selects one of the one or more icons for presentation of the one or more media items associated with the icon further defines the presentation as an enlarged presentation window that is aligned with a vertical centerline of the display.

23. The computer readable medium of claim 22, wherein the enlarged presentation window has a fixed position that is aligned with the focus point.

24. The computer readable medium of claim 1, wherein the first instructions for generating a media management view of one or more media item classification levels, wherein each level includes one or more media item icons further includes generating a first level having a selected icon occupying the focus point and a second level wherein the one or more icons in the second level are related to the selected icon in the first level.

25. The computer readable medium of claim 24, wherein the first instructions for generating a first level and a second level further includes instructions for activating the selected icon in the first level to scroll from the first level to the second level and provide for a second level media icon to occupy the focus point.

26. The computer readable medium of claim 25, wherein the first level is moved underneath and adjacent to the second level.

27. The computer readable medium of claim 1, further comprising fourth instructions for activating a search window that is displayed in conjunction with the media management view.

28. The computer readable medium of claim 1, wherein the third instructions further provide for defining the focus point within the search result level and selecting a generic icon within the search result level for presentation search result information.

29. A computer readable medium storing computer executable instructions for a user-interface application for locating media items in a digital device, the computer executable instructions comprising:
   first instructions for generating a search input field on a display of the digital device; and
   second instructions for generating, in response to a search, a search result level that includes one or more icons, wherein each icon is related to at least one search result media item and wherein the search result level also includes a search result information icon configured to occupy the focus point so as to selectably allow for display of search result information defining categories providing results from the search and indicating a quantity of corresponding media items in each category providing results from the search.

30. The computer readable medium of claim 29, wherein the first instructions for generating a search input field on a display of the digital device is further defined as overlaying a media management view having one or more media item classification levels, wherein each level includes one or more media item icons.

31. The computer readable medium of claim 29, wherein the first instructions further defines the search input field as a keyword search input field.

32. The computer readable medium of claim 29, wherein the second instructions for generating a search result level that includes one or more icons, wherein each icon is related to search result media items further defines the search result level as a horizontally oriented bar.

33. The computer readable medium of claim 29, wherein the second instructions for generating a search result level that includes one or more icons, wherein each icon is related to search result media items further includes instructions for providing a search result information icon that is located at a focus point in the display upon initial display of the search results.

34. The computer readable medium of claim 33, wherein the second instructions for providing a search result information icon that is located at a focus point in the display upon initial display of the search results further provides for a search result information window displayed when the search result information icon is located at the focus point.

35. The computer readable medium of claim 34, wherein the second instructions for providing for a presentation window displayed when the search result information icon is located at the focus point and including detailed search result information entries further defines the detailed search result information entries as a breakdown of search results by media type.

36. The computer readable medium of claim 35, wherein the second instructions for providing for a presentation window that includes detailed search result information further provides for instructions for selecting one of the detailed search result information entries to provide for a second search result level that includes one or more icons, wherein each of the icons are related to the selected detailed search result information.

37. An apparatus comprising:
a processor that executes computer-readable program instructions for accessing media files, the computer-readable program instructions being stored in a memory and comprising:
first instructions for generating a media management view of one or more media item classification levels for each of a plurality of different categories of media items, wherein each level includes one or more media item icons, and wherein a media item classification level of one category of media items includes a media item classification level of another category;
second instructions for defining a focus point within one of the media item classification levels, wherein the focus point has a fixed position within the view and selects one of the one or more icons within the level for presentation of the one or more media items associated with the icon; and
third instructions for generating, in response to a search, a search result level that includes one or more icons, wherein each icon is related to at least one search result media item and wherein the search result level also includes a search result information icon configured to occupy the focus point so as to selectably allow for display of search result information defining categories providing results from the search and indicating a quantity of corresponding media items in each category providing results from the search.

38. The apparatus of claim 37, wherein the apparatus is a portable digital device comprising a display in communication with the processor that presents the media management view.

39. The apparatus of claim 38, wherein the portable digital device is chosen from the group consisting of a mobile telephone, a personal digital assistant (PDA), an image camera, a video camera, an audio record and playback device, a video player, a portable TV, a global positioning system (GPS) device, a wrist watch, a set-top box (STB), a car navigation system, an on-board computer (e.g. in an automotive), and a domestic appliance.

40. The apparatus of claim 37, wherein the processor that executes computer-readable program instructions including first instructions further defines the media item classification levels as horizontally oriented bars that each includes one or more media item icons.

41. The apparatus of claim 37, wherein the processor that executes computer-readable program instructions further comprises fourth instructions for scrolling the one or more media item icons within the search level into the focus point.

42. The apparatus of claim 37, wherein the processor that executes computer-readable program instructions further comprises fourth instructions for scrolling the one or more media item classification levels such that a media item icon from one of the scrolled levels is scrolled into the focus point.

43. The apparatus of claim 37, wherein the processor that executes computer-readable program instructions further comprises fourth instructions for scrolling in a first direction to move the one or more media item icons within the level into the focus point and scrolling in a second direction to move a media item icon from another level into the focus point.

44. The apparatus of claim 37, wherein the processor that executes computer-readable program instructions including first instructions further includes instructions for generating a first level having a selected icon occupying the focus point and a second level wherein the one or more icons in the second level are related to the selected icon in the first level.

45. The apparatus of claim 44, wherein the processor that executes computer-readable program instructions including first instructions further includes instructions for activating the selected icon in the first level to scroll from the first level to the second level and provide for a second level media icon to occupy the focus point.

46. An apparatus comprising:
a processor that executes computer-readable program instructions for accessing media files, the computer-readable program instructions being stored in a memory and comprising:
first instructions for generating a search input field on a display of the digital device; and
second instructions for generating, in response to a search, a search result level that includes one or more icons, wherein each icon is related to at least one search result media item and wherein the search result level also includes a search result information icon configured to occupy the focus point so as to selectably allow for display of search result information defining categories providing results from the search and indicating a quantity of corresponding media items in each category providing results from the search.

47. The apparatus of claim 46, wherein the apparatus is a portable digital device comprising a display in communication with the processor that presents the search input field and the resulting search input level.

48. The apparatus of claim 47, wherein the portable digital device is chosen from the group consisting of a mobile telephone, a personal digital assistant (PDA), an image camera, a video camera, and an audio record and playback device.

49. The apparatus of claim 46, wherein the processor that executes computer-readable program instructions including first instructions further defines the search input field as overlaying a media management view having one or more media item classification levels, wherein each level includes one or more media item icons.

50. The apparatus of claim 46, wherein the processor that executes computer-readable program instructions including second instructions further defines the search result level as a horizontally oriented bar.

51. The apparatus of claim 46, wherein the processor that executes computer-readable program instructions including second instructions further includes instructions for providing a search result information icon that is located at a focus point in the display upon initial display of the search results.

52. The apparatus of claim 51, wherein the processor that executes computer-readable program instructions including second instructions further includes instructions for providing a presentation window displayed when the search result information icon is located at the focus point.

53. The apparatus of claim 52, wherein the processor that executes computer-readable program instructions including second instructions further defines the presentation window as including detailed search result information.

54. The apparatus of claim 53, wherein the processor that executes computer-readable program instructions including second instructions further defines the detailed search result information entries as a breakdown of search results by media type.

55. The apparatus of claim 54, wherein the processor that executes computer-readable program instructions including second instructions further includes instructions for selecting one of the detailed search result information entries to provide for a second search result level that includes one or more icons, wherein each of the icons are related to the selected detailed search result information.

* * * * *